Jan. 25, 1955

L. J. CHAMBON 2,700,544

APPARATUS FOR FEEDING AND TENSIONING
WIRES, STRIPS AND WEBS

Filed Jan. 9, 1951

INVENTOR
LOUIS JEAN CHAMBON
BY:
Haseltine, Lake & Co.
AGENTS

INVENTOR
LOUIS JEAN CHAMBON
By:
Haseltine, Lake & Co.
AGENTS

Jan. 25, 1955

L. J. CHAMBON 2,700,544

APPARATUS FOR FEEDING AND TENSIONING
WIRES, STRIPS AND WEBS

Filed Jan. 9, 1951

INVENTOR
LOUIS JEAN CHAMBON
By:
Haseltine, Lake & Co.
AGENTS

United States Patent Office 2,700,544
Patented Jan. 25, 1955

2,700,544

APPARATUS FOR FEEDING AND TENSIONING WIRES, STRIPS AND WEBS

Louis Jean Chambon, Paris, France, assignor to Societe d'Etudes de Machines Speciales, Paris, France, a corporation of the French Republic Application January 9, 1951, Serial No. 205,072

Claims priority, application France January 10, 1950

17 Claims. (Cl. 271—2.2)

This invention relates to mechanism for reeling and feeding continuous flexible elements such as wires, strips and webs, in various industrial treatments or processes to which such elements have to be subjected. It often occurs that such a flexible element is fed at a constant rate to a station where it is to be subjected to some treatment or other, this treatment taking up the element at a variable rate. For example, the continuous flexible element may be a web of sheet material such as paper and may have to be fed to a cutting station where it is to be cut off into equal lengths by an intermittently-acting cutter device.

In feed mechanisms of this type, there is an input cylinder which revolves at a uniform rate and an output cylinder which revolves at a variable rate corresponding with the variable or intermittent rate of take-up of the element by its treating device, and the problem then arises of maintaining at all times a constant tension in the flexible element regardless of the variations in its rate of take-up. The problem of course is quite similar if it is the input rate of the element which is variable and its output rate constant, and in fact, more generally wherever the input and output rates of feed differ in relative value with time.

It is an object of this invention to provide improved means for maintaining a constant tension in a flexible element regardless of variations in the relative values of its rates of feed to and from a given point; and, more specifically, to maintain tension in such an element which is fed at a constant rate but is used up at a variable or even intermittent rate; or conversely in an element fed at a variable rate and taken up at a constant rate.

Another object is to provide such an arrangement which is reversible, in that it is traversible in either direction by the flexible element.

An important object is to provide an accurate mathematical solution for the above-stated problem and to embody this solution in an efficient and simple mechanical structure.

The invention provides, in combination with an input cylinder and an output cylinder for the flexible element or strip, wherein at least one of said cylinders is driven at a variable rate, a reciprocable tensioning structure engaging the strip in a loop portion thereof intermediate said cylinders and movable in one direction to ease off, and in the opposite direction to take up, the strip in its said loop portion, and means driving said tensioning structure in response to the relative instantaneous values of the cylinder velocities to drive said structure in said one direction when the input velocity is smaller, and in said opposite direction when the input rate is greater, in relative value than the output rate, thereby at all times to compensate for the differences in said rates or velocities.

In practice, the reciprocable tensioning structure preferably consists of a rocker cradle in the form of a cylindrical sector coaxial with and rockable relatively to one of the cylinders and carrying a roller thereon tangent both to said one cylinder and to said cylindrical sector, the strip being trained over said one cylinder, then over said roller and back over said sector and over the other cylinder, or vice versa, to define the said intermediate loop section, rocking movements of said cradle in either direction being mechanically regulated in response to, and as a predetermined mathematical function of, the speed differential between the two cylinders, so as to add to or detract from the length of said loop by amounts compensating for said speed differential. The cradle is driven in its reciprocating rocking movements relatively to said one cylinder coaxial with it by a drive transmission from said other cylinder to the cradle, and the invention defines the set of mathematical conditions which must necessarily prevail between the dimensions of the cylinders, the sector and the roller, as well as the ratio of said drive transmission, in order that the said compensation be at all times obtained. A further and more stringent set of conditions is defined which is to be satisfied if it is desired that, in addition, the tensioning roller be positively driven, rather than simply rotated by friction with the strip.

According to one aspect of the invention, two similar tensioning structures or rocker cradles may be associated to both engage the strip in its central zone between an input and an output cylinder, said cradles being driven coaxially each from a respective one of said cylinders, thereby to provide on both sides of said variable-feed central zone two outer zones in which the rates of feed of the strip are constant and equal, while maintaining at all times a constant tension on said strip throughout the three zones.

The principles of the invention, its objects, as well as the features of construction of mechanism embodying such principles and objects will be more clearly understood from the ensuing exemplary description made with reference to the accompanying drawings, wherein.

Figure 1:
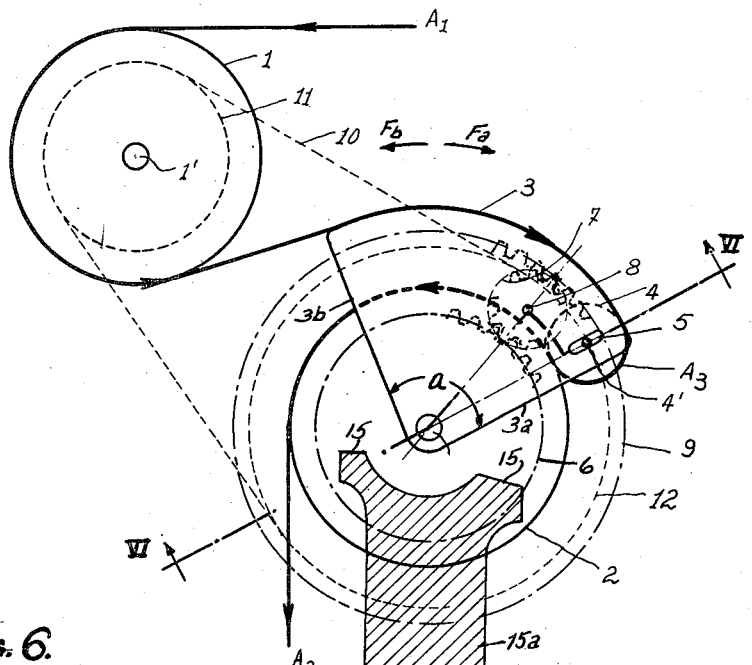
Fig. 1 is a diagrammatic elevational view of a first form of construction of mechanism according to the invention.
Figure 6:
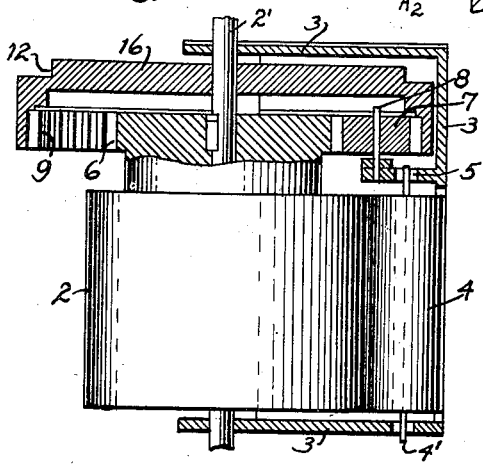
Fig. 6 is a section on line VI—VI of Fig. 1.

The mechanism diagrammatically illustrated in Figs. 1 and 6 essentially comprises a cylinder 1 rotatable on a shaft 1' and adapted to have the input section $A_1$ of the strip passed around it, and a cylinder 2 fixed on a shaft 2' to rotate with the latter and having the output section $A_2$ of the strip passed over it and leading to a load or utilization device operating to take up the strip at a non uniform or intermittent rate. The cylinders 1 and 2 are respectively rotated at the angular velocities or rates $w_1$ and $w_2$ which are at each instant proportional to the linear rates of feed $V_1$ and $V_2$, so that, $R_1$ and $R_2$ being the respective radii of the cylinders, we have $$V_1 = w_1 R_1$$

and $$V_2 = w_2 R_2$$

It will be understood that if the output rate of feed $V_2$ is smaller than the input rate $V_1$, the strip will form a loop $A_3$ between the cylinders 1 and 2, and the length of this loop will at each instant depend on the difference between the two rates of feed.

According to the invention, the loop $A_3$ in the strip is passed around a rocker cradle structure 3 in the form of a cylindrical sector freely rotatable about the shaft 2' and carrying a roller 4 freely rotatable about an axis 4' shown as being itself capable of self-adjusting displacements in a radial guideway slot 5. The rocking displacements of the cradle about the axis of shaft 2' are regulated in response to the difference $V_1 - V_2$ or, in other words, to the length of the loop $A_3$ in such a way that said loop will at all times remain tightly stretched about the sector surface of cradle 3 and its roller 4.

The mechanism provided for achieving this result is constructed as follows. Secured on the shaft 2' is a gear 6 which is keyed to that shaft (Fig. 6) and integral with the cylinder 2. The gear 6 meshes with a gear 7 freely rotatable on a pin 8 integral with the cradle 3; while the gear 7 further meshes with an internal gear annulus 9 which is freely rotatable on the shaft 2' and driven from the cylinder 1 through any appropriate transmission means such that the angular rate $w_9$ of the annulus 9 will be proportional to the rate $w_1$ of the cylinder 1; thus $$\frac{w_9}{w_1} = K \qquad (1)$$

This transmission is schematically indicated in the drawing by a sprocket chain 10 meshing with a sprocket 11 integral with the cylinder 1 and a sprocket 12 integral with the annulus 9.

We shall now discuss the conditions which are to be fulfilled by the radii of the respective cylinders and gears of the above described mechanism in order that the elongation of the intermediate loop section $A_3$ should at all times equal the difference between the lengths of strip respectively unreeled per unit time from the cylinders 1 and 2, that is, should equal in algebraical value the expression $$w_1 R_1 - w_2 R_2$$

and this regardless of the instantaneous values of $w_1$ and $w_2$.

Let
$R_6$ = Radius of gear 6,
$R_9$ = Radius of gear 9,
$R_3$ = Radius of cylinder sector 3,
$w_9$ = Angular velocity of gear 9, and
$w_3$ = Angular velocity of the rocker cradle carrying the cylinder sector 3, gear 7 and roller 4.

The length of intermediate strip section measured off per unit time by the rocking movements of the cradle equals $$w_3 (R_3 + R_2)$$

It is hence necessary that $$w_1 R_1 - w_2 R_2 = w_3 (R_3 + R_2) \qquad (2)$$

Willis's formula as applied to the differential gear-train defined by the gears 6, 7 and 9 gives $$-\frac{w_2 - w_3}{w_9 - w_3} = \frac{R_9}{R_6} \qquad (3)$$

Combining Equations 1, 2 and 3, we may write $$w_1 R_1 - w_2 R_2 = \left(\frac{R_2 + R_3}{R_6 + R_9}\right)(w_2 R_6 - K w_1 R_9) \qquad (4)$$

In order that this equality be verified (i. e. in order that the mechanism be operative) regardless of the values of $w_1$ and $w_2$, it is necessary that the coefficients of $w_1$ and of $w_2$ should each be made equal to zero. A simple calculation then shows that the various constants of the mechanism should satisfy the following set of conditions:

$$\mathrm{I} \begin{cases} (a) & \dfrac{R_2}{R_6} = \dfrac{R_3}{R_9} \text{ or } \dfrac{R_2}{R_3} = \dfrac{R_6}{R_9} \\ (b) & K = \dfrac{R_1}{R_3} \end{cases}$$

This set of mathematical conditions finds practical expression in the following structural characteristics: (a) The radius of the output cylinder 2 is in the same proportion to the radius of the cylinder sector 3 as is the radius of the gear 6 to the radius of the gear 9 of the differential; and (b) the drive ratio from the input cylinder 1 to the rocker sector 3 equals the ratio between the respective radii thereof.

In practice, the operation of the mechanism is further restricted by the fact that the rocker cradle or sector 3 in its displacements in either direction should not deviate by too great an amount from an intermediate position corresponding to the position in which the input and the output velocities are equal and the cradle remains stationary. This is so because, as clearly results from the drawing, the displacement is restricted in the direction $Fa$ (Fig. 1) by abutment of the radial margin $3a$ of the cradle 3 against the output strip section $A_2$ and in the direction $Fb$ (Fig. 1) by abutment of the opposite margin $3b$ of the cradle with the opposite surface of said output strip section $A_2$. The angle $a$ subtended by the cylindrical sector 3 of the cradle should, moreover, be large enough to allow the strip section issuing from the cylinder 1 to apply itself tangentially to the cylindrical sector 3. In practice, a convenient value for the angle $a$ is about 90°, and a suitable value for the maximum permissible deviations of the cradle to either side from its intermediate position is also ±90°.

In practice, for the device to be operative, it is necessary that the average velocities of input and output should periodically become equal at the end of a certain period of time which may be termed the cycle of the mechanism and that the instantaneous velocities throughout such cycle should at no time differ from each other by an amount so great as to cause the cradle to exceed in its rocking motion either of the above-defined end positions. For this purpose, according to a feature of the invention, a pair of limiting stops 15 (Fig. 1), supported in fixed positions on a portion $15a$ of the frame of the device may be arranged at the points beyond which it is desired to keep the cradle from moving.

It is to be noted that, without disturbing the operation of the mechanism, the diameters of the input and output cylinders may be altered provided the proportional relationship be maintained between the radii $R_2$ and $R_3$, and the radii $R_6$ and $R_9$. It has already been mentioned that the invention is applicable, among other uses, to processes wherein a continuous web of sheet material, for example, paper, is to be severed into sections of equal predetermined length, and in which the output apparatus driving the cylinder 2 consists of an intermittently-operated cutting device. In such case, each time the length of the severed sections is to be changed, it will only be necessary to replace the unit comprising the output cylinder 2 and gear 6, by another similar unit in which the cylinder has the requisite radius to provide for the new desired cut-off lengths, and the input cylinder 1, together with its sprocket 11 by another and similar unit, the radii of the two elements in each such interchangeable unit of either the input or the output type being always provided proportional to each other. A common rocker structure 3 may be retained, however, and it is for this purpose that, as already mentioned, the roller 4 is shown as having its journals 4' slidable in radial guiding slots of the rocker to enable the roller to adjust itself automatically in its radial position to the size of the cylinder 2.

Figure 2:
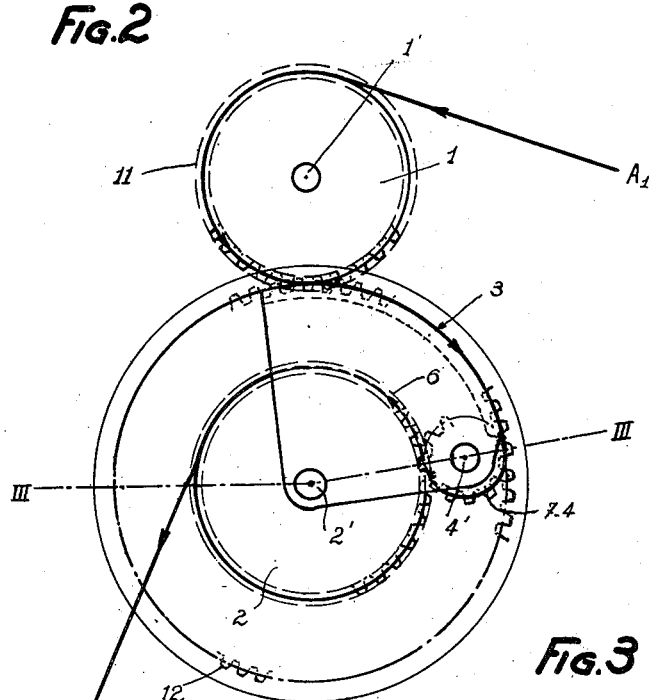
Fig. 2 is a similar view of another form of construction relating to a more narrow aspect of the invention.
Figure 3:
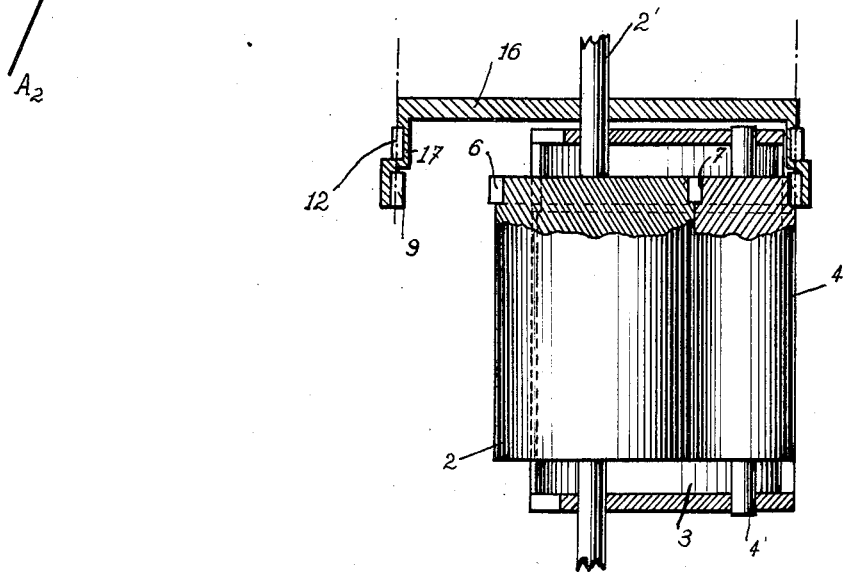
Fig. 3 is a section on line III—III of Fig. 2.

It will be observed that in the embodiment so far described in connection with Fig. 1, the roller 4 is idle, and is driven in rotation by the strip A itself. At each change in the direction of motion of the cradle resulting in a reversal in the direction of rotation of the roller 4, the roller's inertia may result in slippage liable to introduce a disturbance in the smooth operation of the mechanism. The embodiment now to be described with reference to Figs. 2 and 3 is free from this drawback.

If, in the set of conditions (I) we write that the pitch diameter of the inner gear 6 equals the diameter of the cylinder $2a$, we obtain, in lieu of the conditions (I), the more stringent set of conditions as follows:

$$\mathrm{II} \begin{cases} (a) & R_2 = R_6 \\ (b) & R_3 = R_9 \\ (c) & K = \dfrac{R_1}{R_3} = \dfrac{R_1}{R_9} \end{cases}$$

The conditions IIa and IIb means that the radii of the gears 6 and 9 are respectively equal to the radii of the output cylinder $2a$ and of the rocking sector 3, and hence that the axis of the roller 4 at all times remains at the same distance from the axis of the shaft 2' as does the axis of the planetary gear 7. This allows the roller 4 and the gear 7 to be integrally secured on a common shaft 4', so that the roller herein is positively driven thus preventing the afore-mentioned possibility of the strip's slipping.

The condition IIc means that the drive ratio from input cylinder $1a$ to rocker sector 3' equals the ratio between the radii of said input cylinder and outer gear 9. In practice, then, it will be desirable to drive the sector by the meshing engagement of a gear 11' integral with, and equal in pitch diameter to the diameter of, the cylinder $1a$, directly with a gear $12a$ integral with and equal in pitch diameter to that of the internal gear annulus 9 (though of course having external rather than internal teeth), and hence equal also (see condition IIb) to the diameter of the rocking sector 3'. This, then, is the arrangement illustrated in Figs. 2 and 3.

It will be observed that this embodiment does not permit the replacement of the cylinders without at the same time changing the sector structure, as did the construction first described.

In either of the constructions described above, the device, when applied to an assembly (not shown) wherein the output apparatus is one for severing the strip or web, makes it possible to separate the web sections cut off and group them in a plurality of sets separated by longer intervals. The motion of the cylinder 2 or 2a, correlated with the motion of the output web section A2, is then discontinuous. Stopping of this cylinder may be used to cause a cutter member (not shown) to move and sever a predetermined length of the web. Each length thus cut off may be deposited on a conveyor belt (not shown) fed at a constant rate and, owing to this constant feed, the sheets will be received on it in a stepped array, each sheet offset from the preceding one.

Sets of any predetermined number of these sheets may be separated off by adapting a counter (not shown) to the above-described mechanism, said counter being operative, every so many times the cylinder 2 or 2a has stopped, that is, every so many sheets, to withhold for a definite period equivalent say to the intervals between two cutting actions, the feed of the paper web, thus introducing a distinct separation between two successive sheets on the conveyor. Complete stoppage of the cylinder 2 or 2a does not alter the operation of the system; for a complete though momentary stop is only one specific form of discontinuity in the rotation of the output cylinder 2 or 2a, resulting in a greater deviation of the rocker cradle 3 or 3'. The duration of this stopping period should obviously be predetermined with regard to the maximum permissible deviation of the roller 4 for which the end of the sector 3 or 3' disengages the cylinder 1 or 1a. However, the duration of the stopping periods may if required be increased even beyond this amount by suitably altering the law of variation of $w_2$, provided of course the above-stated mathematical conditions remain satisfied.

By arranging two similar mechanisms acccording to the invention at points spaced along the circuit of the web, there may be provided a central zone of irregular feed in between two constant-feed end zones. This result may be achieved by combining into a single assembly the components of both mechanisms, as illustrated in Figs. 4 and 5, where the mechanisms are each shown constructed according to the embodiment of Figs. 2 and 3, described above.

Figure 4:
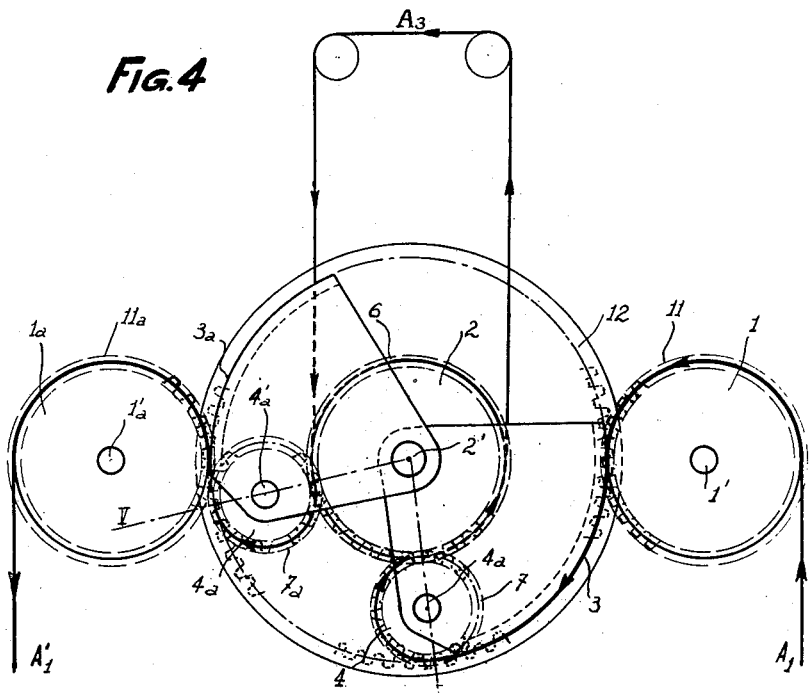
Fig. 4 is a side view of another form of the invention comprising the combination of two elementary assemblies each similar to that shown in Figs. 2 and 3.
Figure 5:
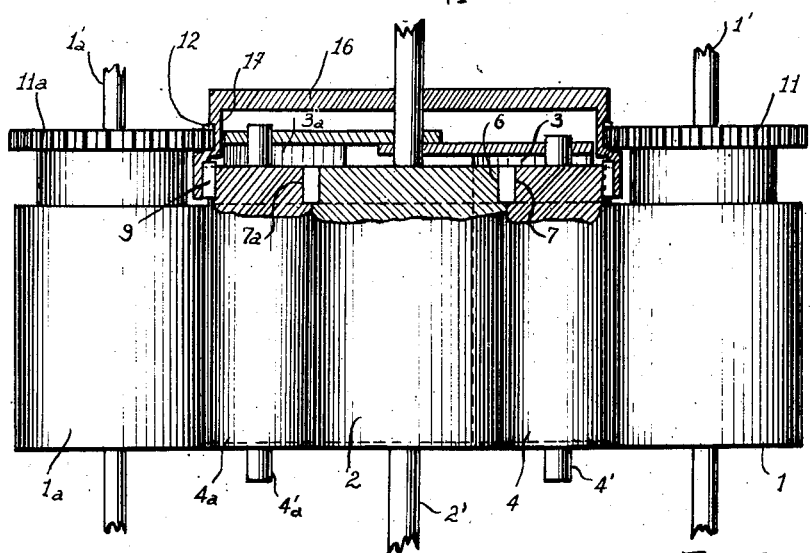
Fig. 5 is a section on line V—V of Fig. 4.

As shown in Figs. 4 and 5, two coaxial rocker cradles are used having the cylindrical sector surfaces 3 and 3a respectively, and supporting the rollers 4 and 4a, respectively, revolving on the shafts or journals 4' and 4'a. The rocker cradles 3 and 3a are freely rockable on a common shaft 2' on which is secured an intermediate cylinder 2 with its integral inner sun-gear 6. Integral with the rollers 4, 4a are the respective planetary gears 7, 7a, both meshing with the common sun-gear 6, and further with a common internal gear annulus 9 formed internally in a drum structure 16—17 which is rotatable on the shaft 2' and is externally formed with the gear annulus 12 equal in pitch diameter to the internal gear annulus 9 and meshing with the respective drive pinions 11, 11a, integral with the constant-speed input and output cylinders 1 and 1a, respectively. Thus, the constant input and output rates of the strip at A1 and A'1 are transmitted from the gear 11 through gear 12 to gear 11a, while the rocking displacements of the cradles 3 and 3a are regulated in response to the variations in the rate of feed of the paper web in its intermediate section or zone A3 where it may be submitted to some irregular or intermittent treatment, thus providing compensation for the resulting variations in the web's tension and allowing the web to issue from the apparatus at the same constant rate at which it is made to enter it.

It will be understood that many variations may be made in the details of the specific arrangements described herein and illustrated in the drawings, which are merely exemplary.

What I claim is:

1. In apparatus for feeding a continuous striplike element; the combination of, an input cylinder and an output cylinder over which said element is trained in succession with at least one of said cylinders being driven at a variable velocity, a reciprocable tensioning structure engaging said strip intermediate said cylinders and movable in one direction to ease off, and in the opposite direction to take up, said strip, and a differential gear train including three gears, a first and a second of said gears being driven by said one cylinder and by the other of said cylinders, respectively, and the third of said gears being in mesh with said first and second gears and carried by said tensioning structure to move said tensioning structure in said one direction when the input velocity is lower, and in said opposite direction when the input velocity is higher, in relative value than the output velocity.

2. In apparatus for feeding a continuous strip-like element; the combination of an input cylinder and an output cylinder over which the striplike element is trained in succession with at least one of said cylinders being driven at a variable rate, a rocker member coaxial with and freely rockable relatively to said one cylinder and engaging said strip in its section intermediate the cylinders to ease said strip off when rocked in one direction, and take it up when rocked in the opposite direction, and a differential train including two gear elements and a planetary-carrier element all coaxial with said one cylinder, one of said gear elements being integral with said one cylinder, another of said gear elements being driven from the other of said cylinders and the third of said gear elements being rotatably carried by said rocker member and meshing with said one gear element and said other gear element to move said rocker member in said one direction relatively to said one cylinder when the output velocity is higher, and in said opposite direction when said output velocity is lower, in instantaneous relative value than the input velocity.

3. In apparatus for feeding a continuous strip-like element; the combination according to claim 2, wherein said rocker member is in the form of a cylindrical sector having a roller at one angular end thereof, and the intermediate strip section is passed from said input cylinder over said sector and over said roller and back around said output cylinder.

4. In apparatus for feeding a continuous strip-like element; the combination of first and second cylinders over which a strip-like element is trained in succession, at least one of said cylinders being driven at a variable rate, a rocker member in the form of a cylindrical sector coaxial with and freely rockable relatively to said second cylinder and a roller on said member at one end of said sector tensioningly engaging the strip-like element in its section intermediate the cylinders, a pair of gears coaxial with said second cylinder, one of said gears being rigid with said second cylinder and the other of said gears being driven from the first cylinder, and a planetary gear carried by said rocker member and meshing with both gears of said pair of gears.

5. In apparatus for feeding a continuous strip-like element; the combination according to claim 4 wherein the ratio between the radius of said one gear of said pair of gears and the radius of said other gear of said pair of gears equals the ratio between the radius of said second cylinder and the radius of said sector, and the drive ratio from said first cylinder to said other gear of said pair of gears equals the ratio between the radius of said first cylinder and that of said sector, whereby the rocking movements of said rocker member will at all times compensate for the variations in the difference between the rotational velocities of said cylinders and will maintain said strip under substantially constant tension.

6. In apparatus for feeding a continuous strip-like element; the combination of an input cylinder and an output cylinder over which a strip-like element is trained in succession, one of said cylinders being driven at a variable rate, a rocker member in the form of a cylindrical sector coaxial with and freely rockable relatively to said one cylinder and a roller on said member at one end of said sector bearing on said one cylinder and tensioningly engaging the strip-like element in its section intermediate said cylinders, a first gear coaxial and rigid with said one cylinder and a second gear coaxial with but freely rotatable relatively to said one cylinder and a drive transmission from said other cylinder to said second gear, a planetary gear on said rocker member meshing with first and second gears, the radius ratio from said first to said second gear equalling the radius ratio from said one cylinder to said sector, and the drive ratio of said transmission equalling the radius ratio from said other cylinder to said sector.

7. In apparatus for feeding a continuous strip-like element; the combination according to claim 6 wherein said one cylinder is said output cylinder.

8. In apparatus for feeding a continuous strip-like element; the combination of an input cylinder and an output cylinder over which a strip-like element is trained in succession, one of said cylinders being driven at a variable rate, a sector-shaped member coaxial with and freely rockable relatively to said one cylinder and a roller at one end of said sector-shaped member engaging the strip-like element in its section intermediate the cylinders to add to the length of said intermediate section when rocked in one direction, and detract from said length when rocked in the other direction, a gear coaxially rotatable with said one cylinder and an internal gear annulus coaxial with and rotatable relatively to said one cylinder, a planetary gear on said sector-shaped member meshing with both said gear and said gear annulus, and a drive transmission from said other cylinder to said gear annulus, wherein the ratio from the radius of said gear to that of said annulus equals the ratio from the radius of said one cylinder to that of said sector-shaped member, and the ratio of said drive transmission equals the ratio from the radius of said other cylinder to that of said sector-shaped member, whereby the rocking movements of said sector-shaped member will at all times compensate for the variations in said variable rate to maintain said strip under tension.

9. In apparatus for feeding a continuous strip-like element; the combination according to claim 8 wherein said one cylinder is replaceable as a unit with said gear, and said roller is supported for free rotation and self-adjusting radial displacement on said sector-shaped member so as to bear on the periphery of said one cylinder substantially regardless of its size.

10. In apparatus for feeding a continuous strip-like element; the combination according to claim 9 which further comprises limiting stops restricting the angular displacements of said sector-shaped member away from its central position.

11. In apparatus for feeding a continuous strip-like element; the combination of an input cylinder and an output cylinder over which a strip-like element is trained in succession, one of said cylinders being driven at a variable rate, a sector-shaped rocker member coaxial with and freely rockable relatively to said one cylinder and a roller thereon at one end of said sector-shaped rocker member bearing on said one cylinder and engaging the strip-like element intermediate said cylinders to ease off the strip-like element when rocked in one direction, and take it up when rocked in the other direction, a first gear coaxially rotatable with and equal in pitch diameter to the outer diameter of said one cylinder, a second and internal gear annulus coaxially rotatable relatively to and equal in pitch diameter to the outer diameter of said sector-shaped rocker member, a planetary gear coaxially rotatable with said roller and meshing with said first and second gears, a drive gear coaxially rotatable with and equal in pitch diameter to the outer diameter of the other of said cylinders, and a gear coaxially rotatable with and equal in pitch diameter to that of said internal gear annulus and meshing with said drive gear, whereby the differentially-regulated rocking movements of said rocker member will at all times compensate for the variations in said variable rate to maintain said strip under tension.

12. In apparatus for feeding a continuous strip-like element; the combination of an input cylinder, an intermediate cylinder and an output cylinder over which a strip-like element is trained in succession, said input and output cylinders being driven at a constant rate and said intermediate cylinder being driven at a variable rate; a pair of sector-shaped rocker members coaxial with and rotatable relatively to said intermediate cylinder and each engaging the strip-like element in a section thereof between said intermediate and a respective one of said input and output cylinders and each rockable in one direction to ease off, and in the opposite direction to take up its related strip section; a pair of differential gear trains coaxial with said intermediate cylinder and each including: one gear element rigid with said intermediate cylinder, another gear element driven from the related one of said input and output cylinders and a third gear element carried by the related rocker member and meshing with both said one gear element and said other gear element of the related gear train; whereby the differentially-regulated movements of said rocker members will at all times compensate for the variations in said variable rate of the intermediate cylinder.

13. In apparatus for feeding a continuous strip-like element; the combination of an input cylinder, an intermediate cylinder and an output cylinder over which a strip-like element is trained in succession, said input and output cylinders being driven at a constant rate and said intermediate cylinder being driven at a variable rate; a pair of sector-shaped rocker members coaxial with and rotatable relatively to said intermediate cylinder and each having a roller bearing on said intermediate cylinder and engaging the strip-like element in a section thereof between said intermediate cylinder and a respectively related one of said input and output cylinders; a pair of differential trains coaxial with said intermediate cylinder and each including: one sungear rigid with said intermediate cylinder, an internal gear annulus driven from the related one of said input and output cylinders and a planetary gear carried by the related rocker member; wherein the radius ratio from said one sungear to said internal gear annulus in each train equals the radius ratio from said intermediate cylinder to the related rocker member, and the drive ratio from each of said input and output cylinders to its related internal gear annulus equals the radius ratio from said input and output cylinders, respectively, to the related rocker member; whereby the differentially controlled rocking movements of said rocker members will at all times compensate for the variations in said variable rate of the intermediate cylinder.

14. In apparatus for feeding a continuous strip-like element; the combination of an input cylinder, an intermediate cylinder and an output cylinder over which a strip-like element is trained in succession, said input and output cylinders being similar in radius and driven at a common constant rate, and said intermediate cylinder being driven at a variable rate; a pair of similar sector-shaped rocker members coaxial with and rotatable relatively to said intermediate cylinder and each having a roller bearing on said intermediate cylinder and engaging the strip-like element in a section thereof between said intermediate and a respectively related one of said input and output cylinders; a common sun gear coaxially rigid with said intermediate cylinder, an internal gear annulus coaxially rotatable relatively to said intermediate cylinder and driven from one of said input and output cylinders; and a planetary gear on each of said rocker members each meshing with both said sun gear and said internal gear annulus; wherein the radius ratio from said common sun gear to said internal gear annulus equals the radius ratio from said intermediate cylinder to either sector, and the drive ratio from said input and output cylinders to said internal gear annulus equals the radius ratio from either of said input and output cylinders to either of said sectors.

15. In apparatus for feeding a continuous strip-like element; the combination according to claim 14, wherein said common sun gear equals in pitch diameter the outer diameter of said intermediate cylinder, said internal gear annulus equals in pitch diameter the outer diameter of either of said sectors, and each of said planetary gears is rigid with the related roller.

16. In apparatus for feeding a continuous strip-like element; the combination according to claim 15, wherein the drive from one of said input and output cylinders to said internal gear annulus comprises a first gear rigid with and equal in pitch diameter to the outer diameter of each of said input and output cylinders, and a second gear rigid with and equal in pitch diameter to that of said internal gear annulus and meshing with each of said first gears, whereby said common constant rate is transmitted from said input to said output cylinder through said first and second meshing gears.

17. In apparatus for feeding a continuous web; the combination of an input cylinder rotated at a constant rate and an output cylinder rotated at a variable rate and having a web trained thereover in succession, a rocker member in the form of a cylindrical sector coaxial with and freely rockable relatively to said output cylinder and a roller on said rocker member at one end of said sector bearing on said output cylinder and tensioningly engaging the web intermediate said cylinders, a first gear coaxial with and rigid with said ouput cylinder and a second gear coaxial with but freely rotatable relatively to said output cylinder and a drive transmission from said input cylinder to said second gear, a planetary gear on said rocker meshing with said first and second gears, the radius ratio from said first gear to said second gear equalling the radius ratio from said output cylinder to said sector, and the drive ratio from said input cylinder to said second gear equalling the radius ratio from said input cylinder to said sector, whereby the differentially-controlled rocking movements of the rocker member will compensate for the variations in the rate of rotation of said output cylinder to maintain a constant tension in said web intermediate both cylinders.

References Cited in the file of this patent

UNITED STATES PATENTS

| | | |
|---|---|---|
| 1,648,769 | Hugo | Nov. 8, 1927 |
| 1,986,776 | Moore | Jan. 1, 1935 |
| 2,102,793 | George | Dec. 21, 1937 |